US011984279B2

(12) United States Patent
Chen

(10) Patent No.: US 11,984,279 B2
(45) Date of Patent: May 14, 2024

(54) LIFTER WITH DAMPING

(71) Applicant: PEZ CROWN INTERNATIONAL COPRPORATION, Taipei (TW)

(72) Inventor: Yu-Chen Chen, Taipei (TW)

(73) Assignee: PEZ CROWN INTERNATIONAL COPRPORATION, Taipei (TW)

( * ) Notice: Subject to any disclaimer, the term of this patent is extended or adjusted under 35 U.S.C. 154(b) by 35 days.

(21) Appl. No.: 18/071,532

(22) Filed: Nov. 29, 2022

(65) Prior Publication Data

US 2023/0335354 A1 Oct. 19, 2023

(30) Foreign Application Priority Data

Apr. 14, 2022 (TW) ................................ 111203779

(51) Int. Cl.
*H01H 3/60* (2006.01)
*H01H 13/18* (2006.01)
*H01H 13/7073* (2006.01)

(52) U.S. Cl.
CPC ........ *H01H 13/7073* (2013.01); *H01H 13/18* (2013.01)

(58) Field of Classification Search
CPC ...... H01H 13/7073; H01H 13/18; H01H 3/60; H01H 2221/062; H01H 2215/03; F16F 15/04; F16F 7/00; F16F 15/022; F16F 15/08; F16F 15/067; F15B 15/228
See application file for complete search history.

(56) References Cited

U.S. PATENT DOCUMENTS

| | | | | | |
|---|---|---|---|---|---|
| 5,690,315 | A * | 11/1997 | Thomas | B66F 3/24 | 254/2 C |
| 6,305,668 | B1 * | 10/2001 | Edens | B66F 3/24 | 254/93 R |
| 6,308,821 | B1 * | 10/2001 | Asai | F15B 15/228 | 198/750.7 |
| 6,481,334 | B1 * | 11/2002 | Kaneko | F15B 15/082 | 92/88 |
| 8,827,246 | B2 * | 9/2014 | Swasey | B66F 3/22 | 254/89 R |

* cited by examiner

*Primary Examiner* — Ahmed M Saeed
(74) *Attorney, Agent, or Firm* — Che-Yang Chen; Law Office of Michael Chen

(57) ABSTRACT

A lifter with damping is disclosed. It comprises: an outer casing, having an opening on a top end thereof, a gear rack formed on an inside of one side thereof, a guiding groove formed on an opposite side of the gear rack, and two accommodating bins extend downwards on the bottom of the outer casing; a moving body, movably installed inside the outer casing, wherein a round hole is formed in a middle portion of the moving body, a limiting hook is formed corresponding to the guiding groove so as to slide along the guiding groove, bottoms of the moving body corresponding to the two accommodating bins form a hollow slider, respectively, a grab bar is formed horizontally between the hollow sliders, and each hollow slider houses a spring; a damping gear, inserted into the round hole and rotatably connected to the gear rack; and a circulating hooking assembly.

7 Claims, 9 Drawing Sheets

LIFTER WITH DAMPING

FIELD OF THE INVENTION

The present invention relates to a lifter. More particularly, the present invention relates to a lifter with damping for electronic switch.

BACKGROUND OF THE INVENTION

A damper is a mechanical device that uses damping characteristics to absorb or suppress force to slow down mechanical vibration and consume kinetic energy. A lifter with damping has a wide range of applications, ranging from hydraulic shock absorption of automobiles to dynamic earthquake resistance of high-rise buildings, internalizing external forces into the lifter with damping to reduce shocks, thereby providing protection for the operation of related equipment.

In addition, since the damper has the characteristics of absorbing external force and hysteretic movement during operation, the damper also has applications other than shock absorption, such as an auxiliarily for lifting mechanisms, e.g., switches. Under certain operating requirements, after the user presses the lifting mechanism to complete the action, it is not desirable to cause touch by mistake due to rapid rebound when the lifting mechanism is released (being pressed again). It is necessary to add an auxiliarily device with damping for the operation of the lifting mechanism. For some 3C products with such operational requirements, there are not many suitable options for lifter with damping. First, most of the existing lifters with damping are bulky and difficult to assemble; moreover, most of the existing lifters with damping are hydraulic, which easily pollutes the circuit structure.

In order to provide a lifter with damping that is light, thin, short, and easy to operate for 3C products, the present invention is created.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to meet the requirements mentioned above, a lifter with damping is disclosed in the present invention. The lifter with damping comprises: an outer casing, having an opening on a top end thereof, a gear rack formed on an inside of one side thereof, a guiding groove formed on an opposite side of the gear rack, and two accommodating bins extend downwards on two sides of a bottom of the outer casing, wherein a central opening is formed between two accommodating bins and a fixing rod is formed on the bottom of each accommodating bin; two springs; a moving body, movably installed inside the outer casing, wherein a round hole is formed in a middle portion of the moving body, a limiting hook is formed corresponding to the guiding groove so as to slide along the guiding groove, bottoms of the moving body corresponding to the two accommodating bins form a hollow slider, respectively, a grab bar is formed horizontally between the hollow sliders, each hollow slider houses a spring, and one end of the spring is inserted by one fixing rod thus the hollow slider is able to slide to the corresponding accommodating bin and compress the spring at the same time in the outer casing; a damping gear, inserted into the round hole and rotatably connected to the gear rack, wherein when the damping gear rotates, kinetic energy of the outer casing moving relatively to the moving body is able to be absorbed; and a circulating hooking assembly, installed in the outer casing through the central opening.

When the moving body is pressed to move toward the outer casing, the circulating hooking assembly hooks the grab bar to temporarily fix the outer casing and the moving body in a closed state. When the moving body is pressed again under the closed state, the circulating hooking assembly releases the grab bar, letting the moving body rebound relative to the outer casing until the limiting hook hooks one end of the guiding groove.

Preferably, the damping gear is a PG-07F rotary plastic damper.

Preferably, the circulating hooking assembly is a DL-250 push latch.

Preferably, a plurality of first connecting holes are formed on one end of the moving body.

Preferably, a connecting board is further formed around the exterior of the outer casing, and a plurality of second connecting holes are formed on the connecting board.

Preferably, a plurality of guiding rails are formed inside the outer casing to limit and guide the moving body maintaining a linear movement inside the outer casing.

Preferably, the moving body further has an installation groove formed around the round hole for auxiliarily installing the damping gear on the moving body.

With the damping provided by the damping gear while the present invention is under moving, the volume of the lifter with damping can be reduced and there is no problem of oil spills like traditional dampers. It is suitable for use as an accessory for 3C products.

DETAILED DESCRIPTION OF THE PREFERRED EMBODIMENTS

Figure 1:
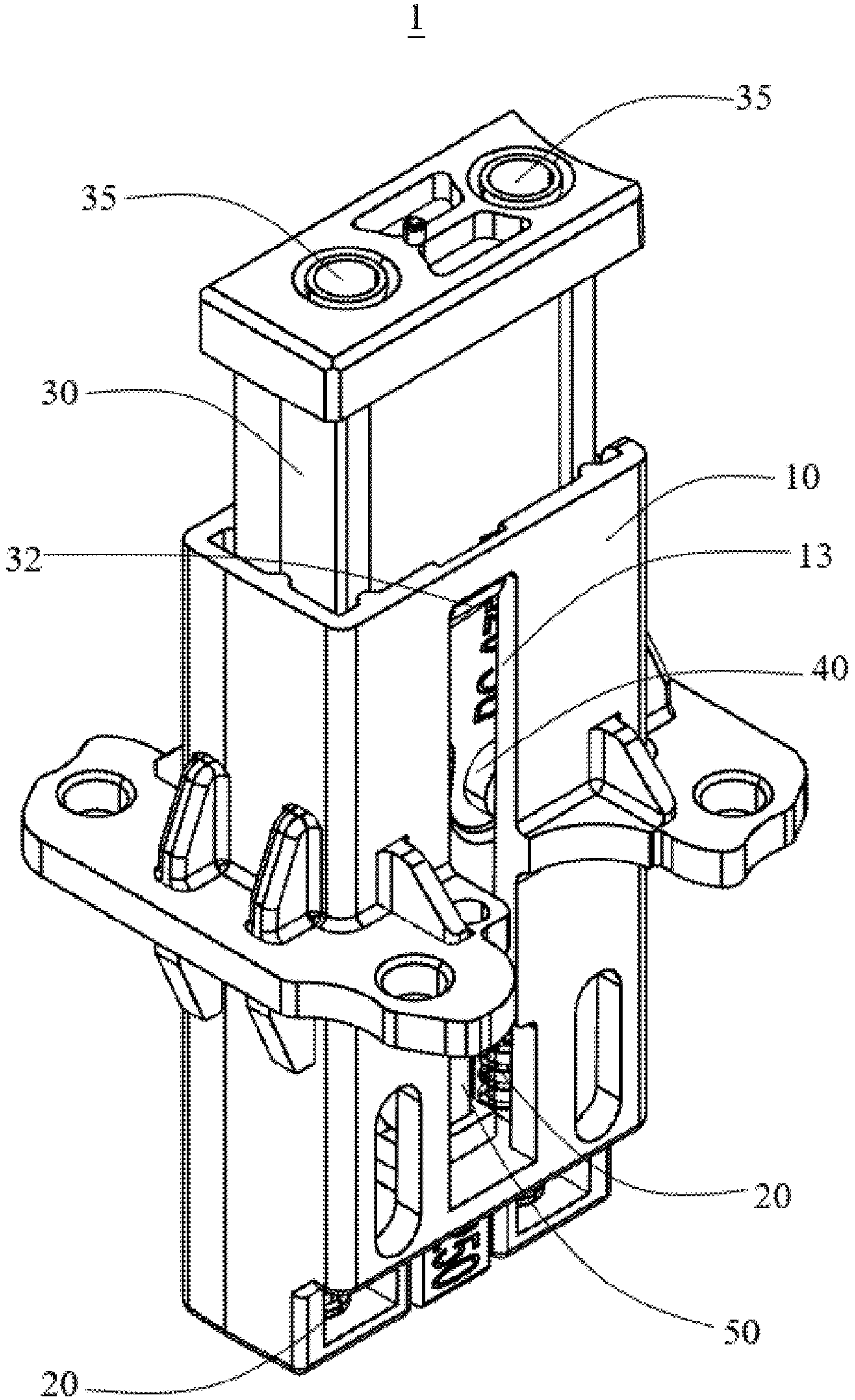
FIG. 1 is a stereogram of a lifter with damping in an open state according to an embodiment of the present invention.

The present invention will now be described more specifically with reference to the following embodiments.

In conjunction with the following description about the embodiment, refer to the relevant drawings at the same time. See FIG. 1. It is a stereogram of a lifter with damping 1 in an open state according to an embodiment of the present invention. According to the present invention, the lifter with damping 1 comprises an outer casing 10, two springs 20, a moving body 30, a damping gear 40 and a circulating hooking assembly 50. The type, structure and operation mode of these technical elements will be described in detail as follows.

Figure 2:
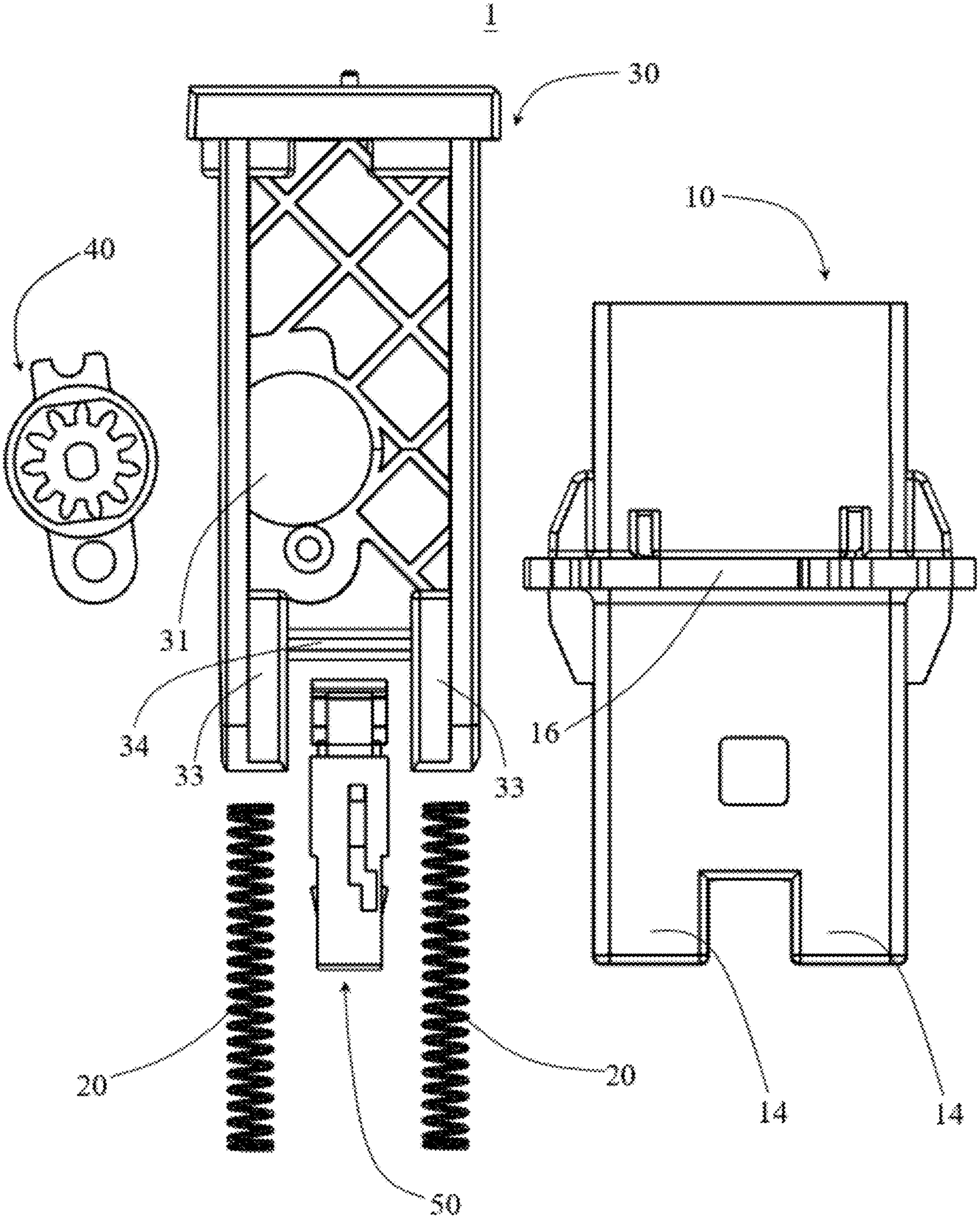
FIG. 2 is an exploded diagram of the lifter with damping.
Figure 3:
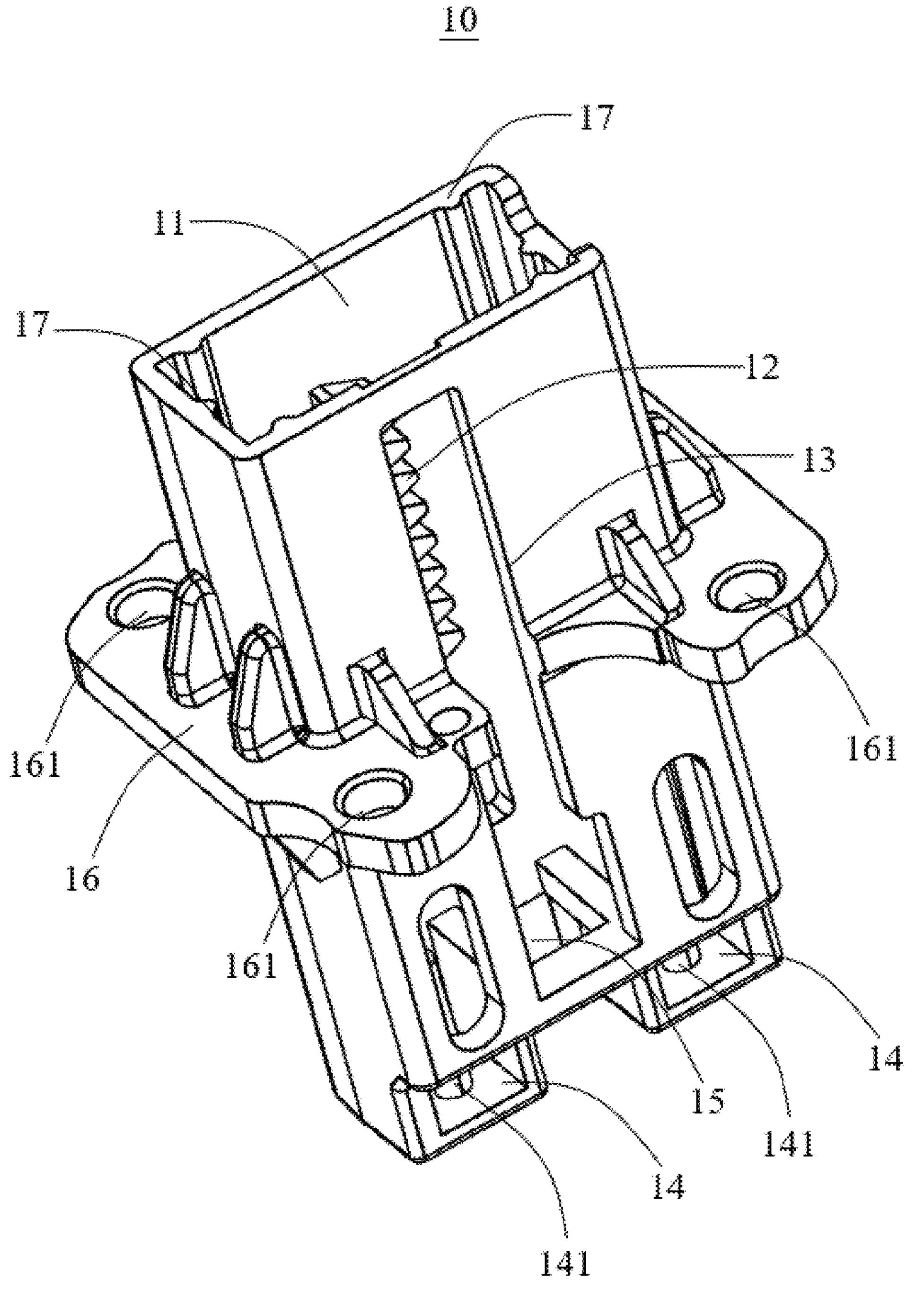
FIG. 3 is a stereogram of an outer casing.

See FIG. 2 and FIG. 3. FIG. 2 is an exploded diagram of the lifter with damping 1. FIG. 3 is a stereogram of the outer casing 10. An opening 11 is formed on a top end of the outer casing 10. In the present embodiment, the opening 11 has a shape close to a rectangle. A gear rack 12 is formed on an inside of one side of the outer casing 10. A guiding groove 13 is formed on an opposite side of the gear rack 12. Two accommodating bins 14 extend downwards on both sides of a bottom of the outer casing 10. A central opening 15 is formed between two accommodating bins 14. A fixing rod 141 is formed on the bottom of each accommodating bin 14.

In addition, a connecting board 16 is further formed around the exterior of the outer casing 10. A number of second connecting holes 161 are formed on the connecting board 16. In the present embodiment, there are 4 second connecting holes 161 (one is obscured and cannot be shown). The second connecting hole 161 is used for devices that need to be used with the lifter with damping 1, such as a switch (not shown), designed to be connected by screws or connecting rods.

Figure 4:
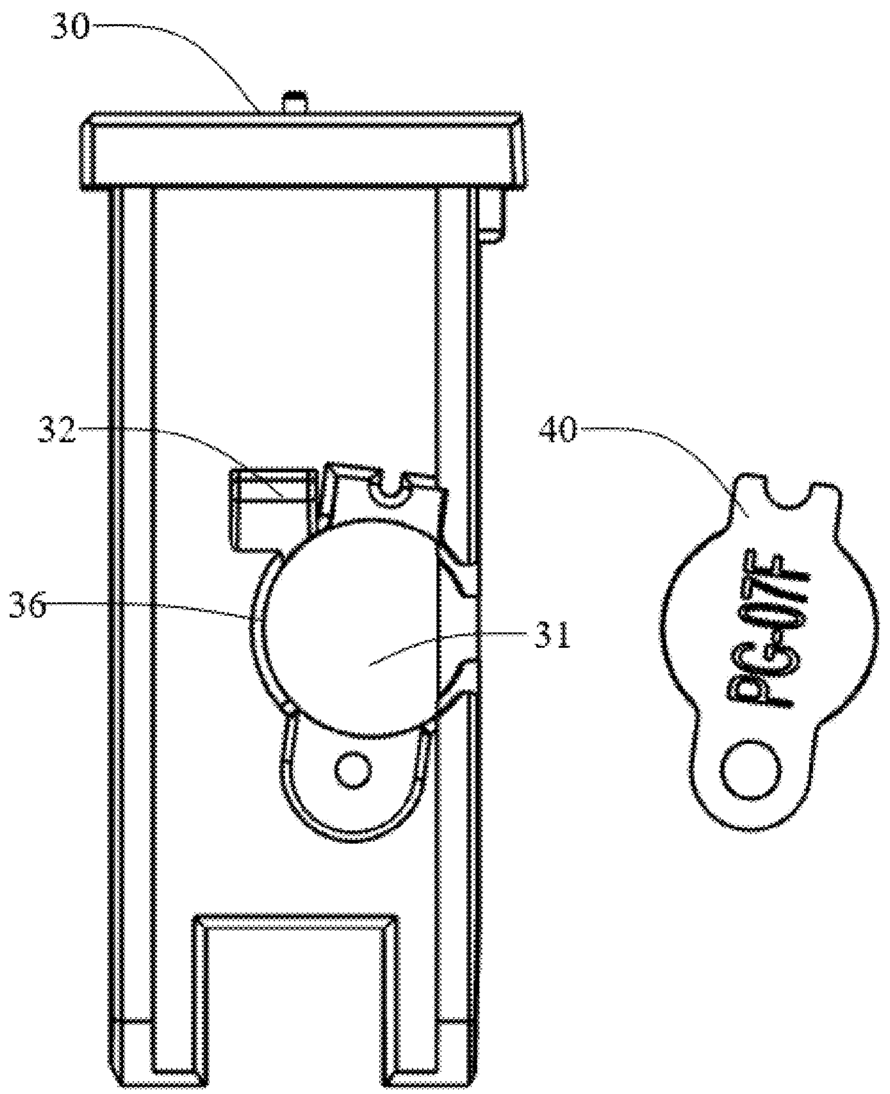
FIG. 4 illustrates exteriors of a moving body and a damping gear.
Figure 5:
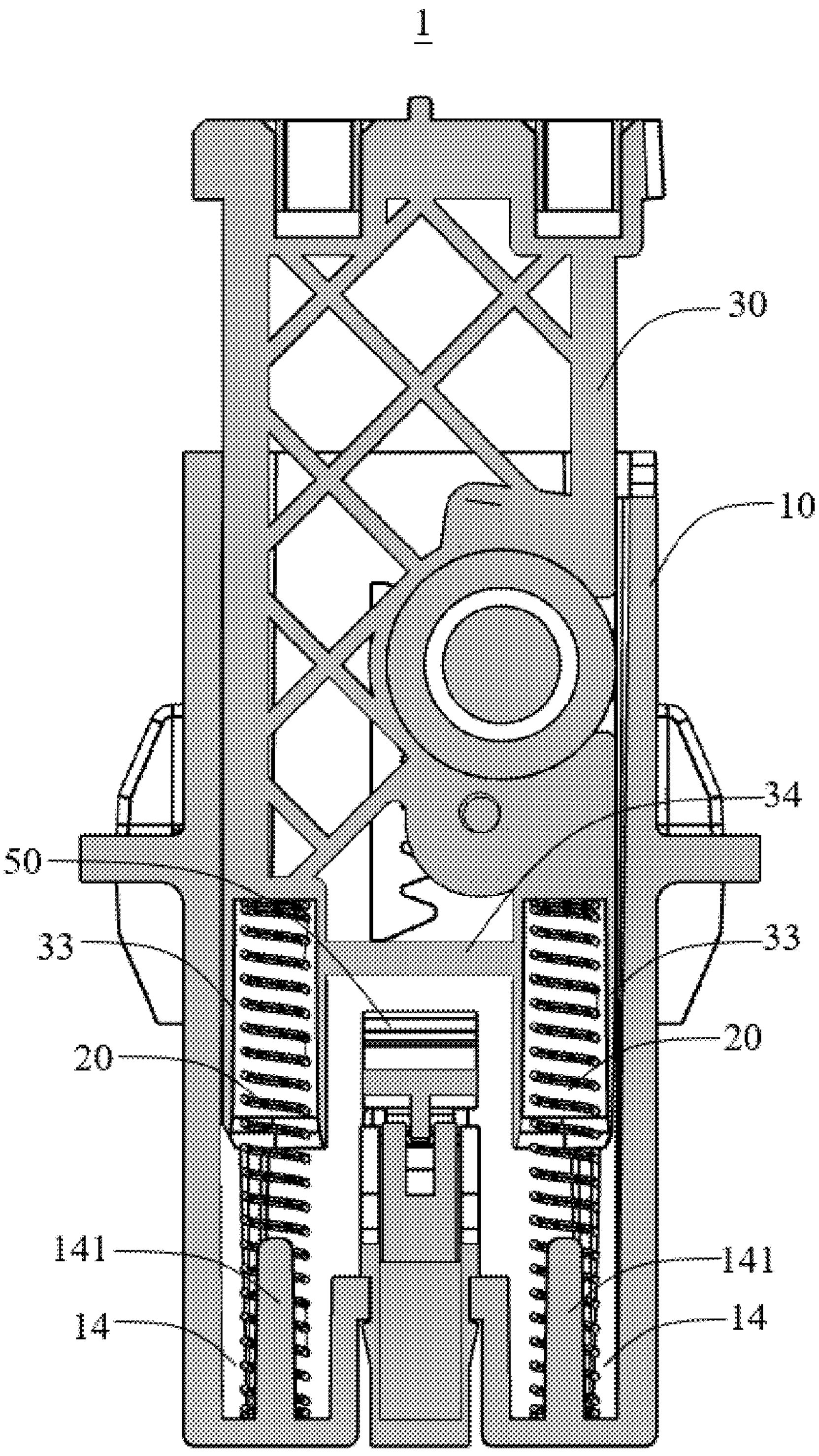
FIG. 5 is a sectional view along the center of the lifter with damping.

Refer to FIG. 2 and FIG. 4. FIG. 4 illustrates exteriors of a moving body 30 and a damping gear 40. The moving body 30 is movably installed inside the outer casing 10, as shown in FIG. 1A round hole 31 is formed in a middle portion of the moving body 30. A limiting hook 32 is formed corresponding to the guiding groove 13 so as to slide along the guiding groove 13. Bottoms of the moving body 30 corresponding to the two accommodating bins 14 form a hollow slider 33, respectively. A grab bar 34 is formed horizontally between the hollow sliders 33. See FIG. 5. It is a sectional view along the center of the lifter with damping 1. Each hollow slider 33 houses a spring 20. One end of each spring 20 is inserted by a fixing rod 141, thus the hollow slider 33 is able to slide to the corresponding accommodating bin 14 and compress the spring 20 at the same time int the outer casing 10. In addition, coming with the moving body 30, a number of guiding rails 17 are formed inside the outer casing 10. What the guiding rail 17 does is to limit and guide the moving body 30 maintaining a linear movement inside the outer casing 10.

As shown in FIG. 1, a number of first connecting holes 35 are formed on one end of the moving body 30. In the present embodiment, there are two first connecting hole 35. Like the second connecting hole 161, the first connecting hole 35 is used for devices that need to be used with the lifter with damping 1, designed to be connected by screws or connecting rods. When the first connecting hole 35 and the second connecting hole 161 are respectively connected to different positions of the device used with the lifter with damping 1, the device moves to drive the outer casing 10 and the moving body 30 to move mutually through the first connecting hole 35 and the second connecting hole 161, respectively.

Figure 6:
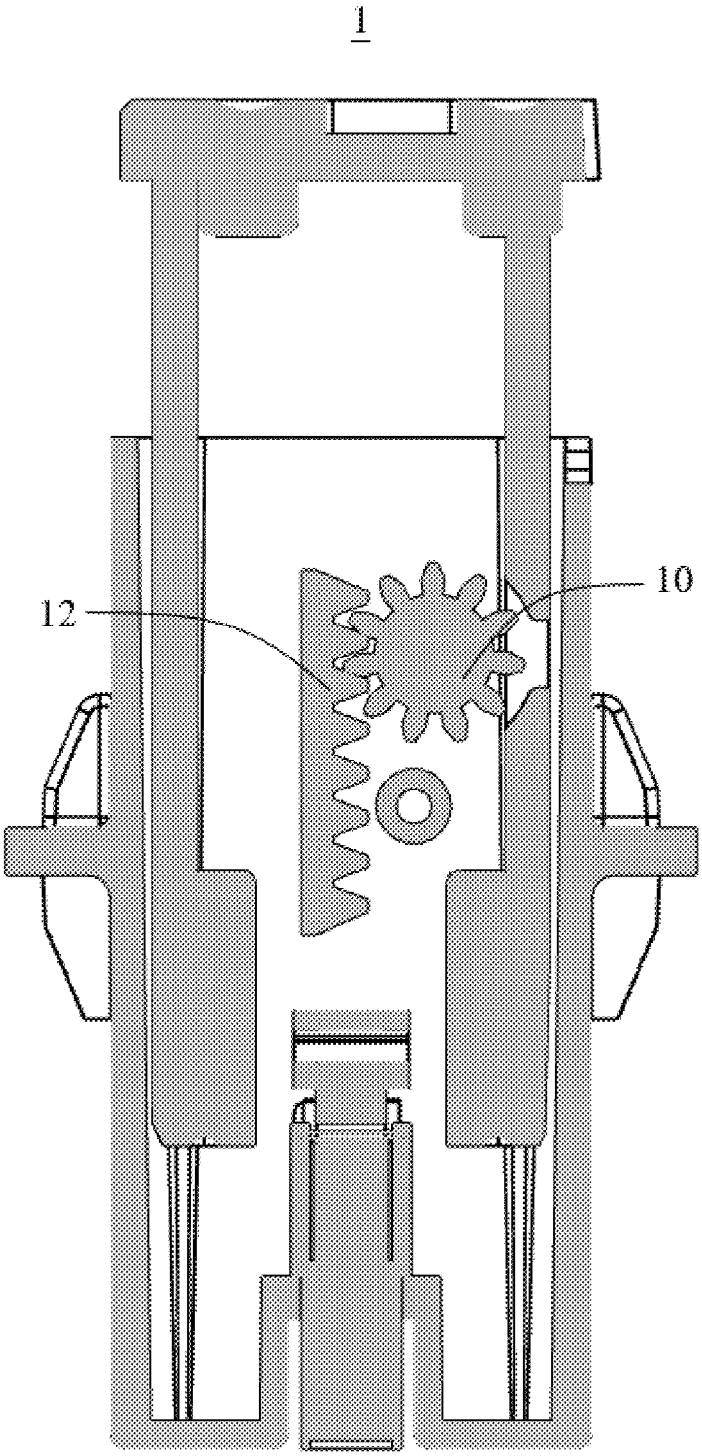
FIG. 6 is another sectional view of the lifter with damping parallel to the sectional view of FIG. 5.

See FIG. 4 and FIG. 6. FIG. 6 is another sectional view of the lifter with damping 1 parallel to the sectional view of FIG. 5. The damping gear 40 can be inserted into the round hole 31 and rotatably connected to the gear rack 12. When the damping gear 40 rotates, kinetic energy of the outer casing 10 moving relatively to the moving body 30 is able to be absorbed. Since the damping gear 40 must be mounted near the round hole 31, thus it can be inserted into the round hole 31. Therefore, the moving body 30 may further has an installation groove 36 formed around the round hole 31, with a perimeter shape of a base of the damping gear 40, for auxiliarily installing the damping gear 40 on the moving body 30. In the present embodiment, the damping gear 40 used may be the damping device disclosed in the Republic of China Patent No. M299797. In practice, a product from Pingood Enterprise Co., LTD, PG-07F rotary plastic damper, may also be used.

Figure 7:
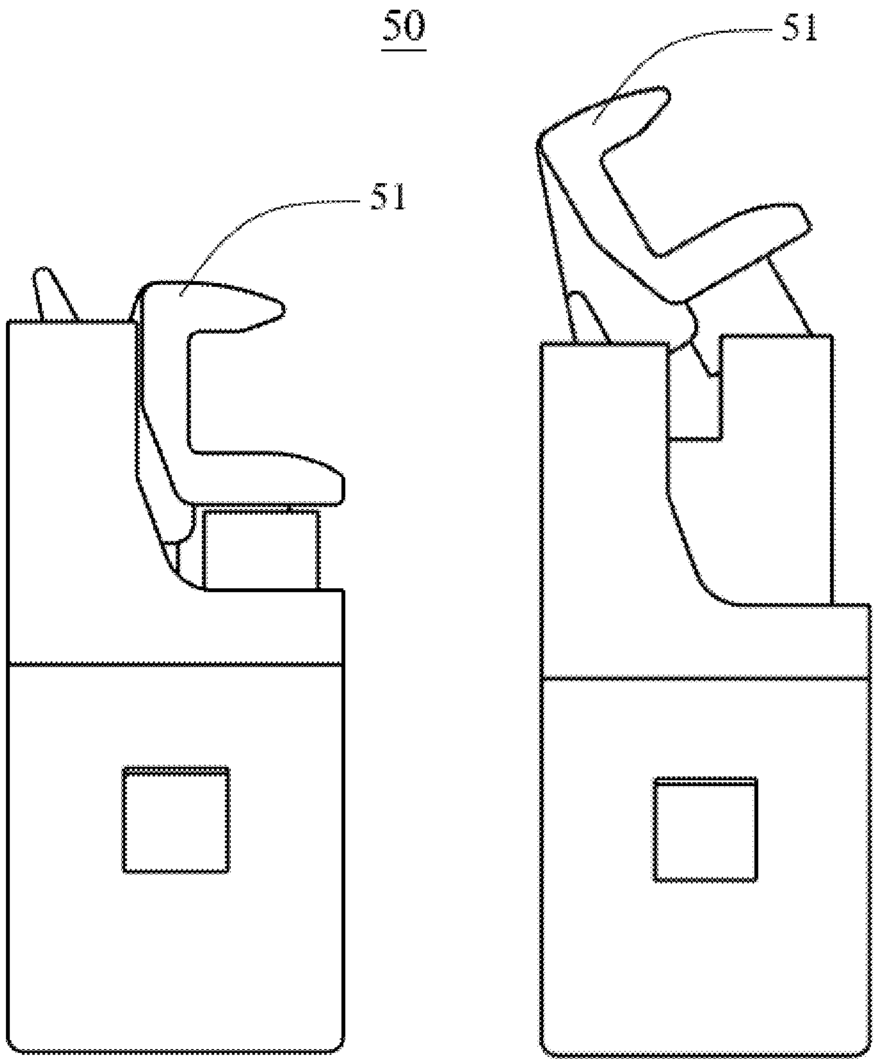
FIG. 7 illustrates aspects of a hook part when a circulating hooking assembly is under compression and rebound, respectively.
Figure 8:
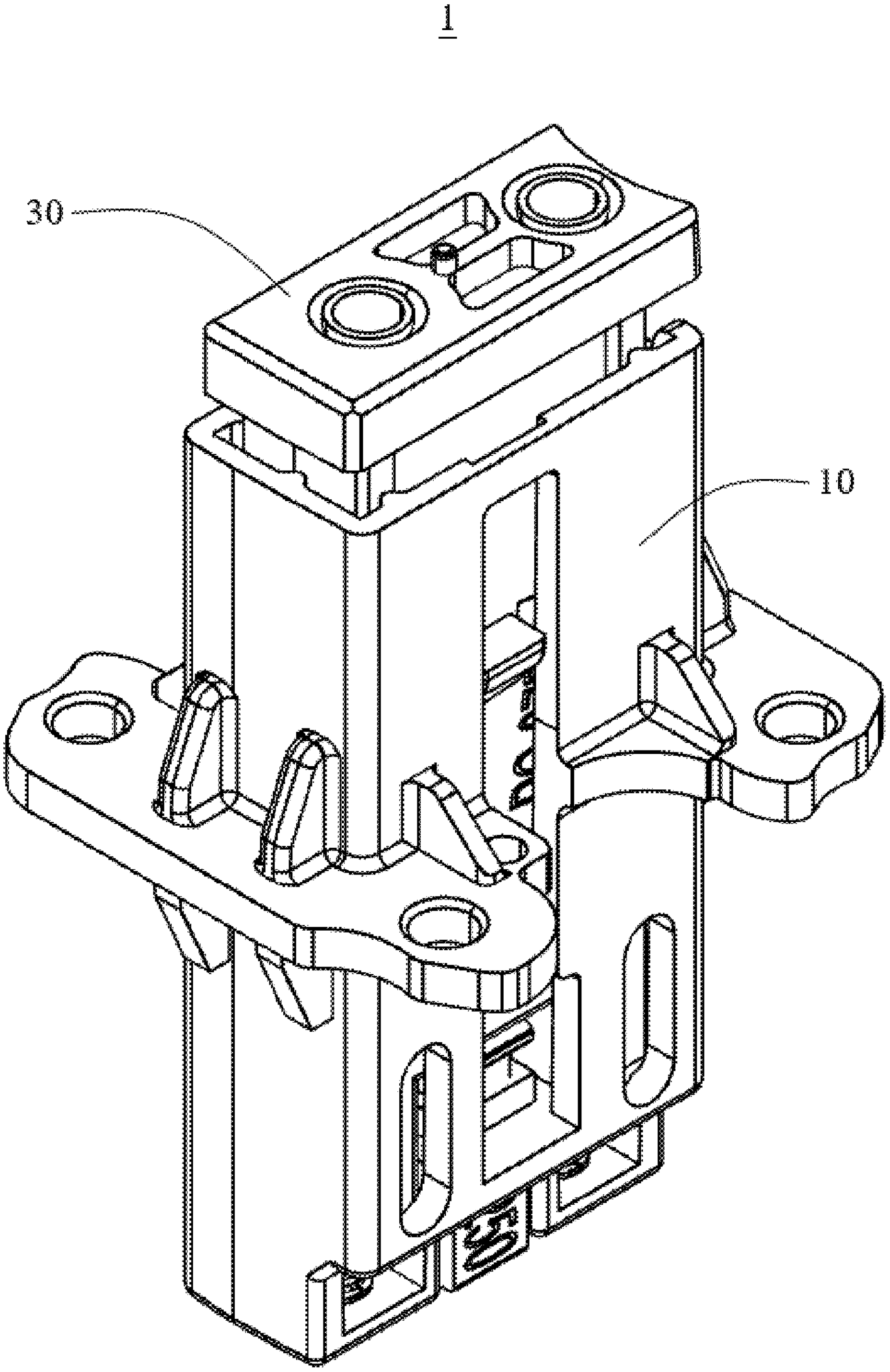
FIG. 8 is a stereogram of the lifter with damping in a closed state.

The circulating hooking assembly 50 may be installed in the outer casing 10 through the central opening 15. The circulating hooking assembly 50 may be a device that can be cyclically pressed and released, and adjust the position of its hook. See FIG. 7. Left side of FIG. 7 illustrates when the circulating hooking assembly 50 is pressed, a hook part 51 of the circulating hooking assembly 50 is temporarily indented under pressure; right side of FIG. 7 illustrates when the circulating hooking assembly 50 is rebound under further pressure, the hook part 51 is temporarily popped up. Because the hook part 51 will have different positions and angles when it is pressed and released, the hook part 51 can be used to grab the grab bar 34 when the circulating hooking assembly 50 is pressed and release the grab bar 34 when it rebounds. Thus, the lifter with damping 1 can be maintained in the closed state as shown in FIG. 8. Compared FIG. 8 with FIG. 1, when the lifter with damping 1 is in the closed state, the extent to which the moving body 30 protrudes from the outer casing 10 is more than that in the open state. In the present embodiment, the circulating hooking assembly 50 used may be the buckle structure disclosed in the Republic of China Patent No. M377672. In practice, a product from Pingood Enterprise Co., DL-250 push latch, may also be used.

Figure 9:
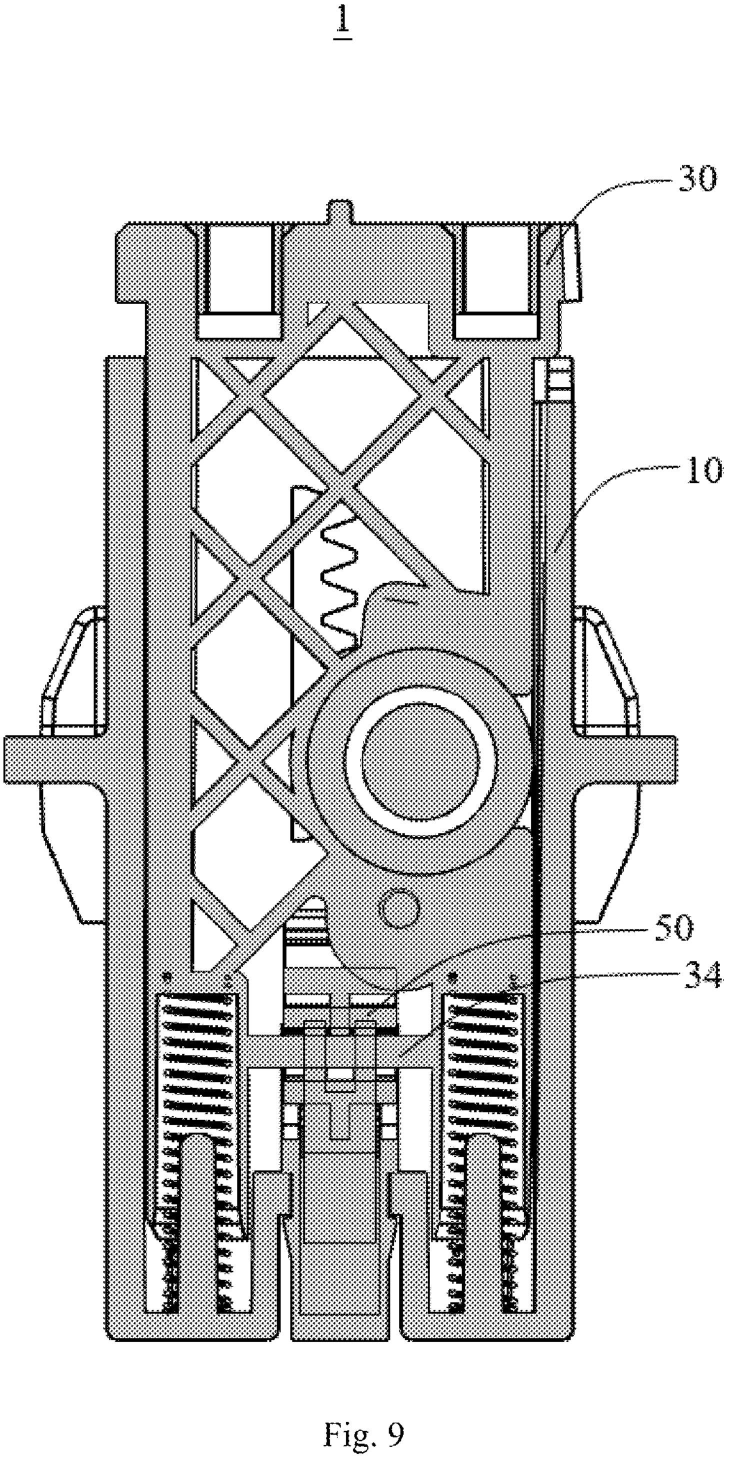
FIG. 9 is a central sectional view of the lifter with damping in the closed state.

See FIG. 9. It is a central sectional view of the lifter with damping 1 in the closed state. When the moving body 30 is pressed to move toward the outer casing 10, the circulating hooking assembly 50 hooks the grab bar 34 to temporarily fix the outer casing 10 and the moving body 30 in the closed state; when the moving body 30 is pressed again under the closed state, the circulating hooking assembly 50 releases the grab bar 34, letting the moving body 30 rebound relative to the outer casing 10 until the limiting hook 32 hooks one end of the guiding groove 13. The open state is restored, as shown in FIG. 1.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A lifter with damping, comprising:

an outer casing, having an opening on a top end thereof, a gear rack formed on an inside of one side thereof, a guiding groove formed on an opposite side of the gear rack, and two accommodating bins extend downwards on two sides of a bottom of the outer casing, wherein a central opening is formed between two accommodating bins and a fixing rod is formed on the bottom of each accommodating bin;

two springs;

a moving body, movably installed inside the outer casing, wherein a round hole is formed in a middle portion of the moving body, a limiting hook is formed corresponding to the guiding groove so as to slide along the guiding groove, bottoms of the moving body corresponding to the two accommodating bins form a hollow slider, respectively, a grab bar is formed horizontally between the hollow sliders, each hollow slider houses a spring, and one end of the spring is inserted by one fixing rod thus the hollow slider is able to slide to the corresponding accommodating bin and compress the spring at the same time in the outer casing;

a damping gear, inserted into the round hole and rotatably connected to the gear rack, wherein when the damping gear rotates, kinetic energy of the outer casing moving relatively to the moving body is able to be absorbed; and a circulating hooking assembly, installed in the outer casing through the central opening, wherein, when the moving body is pressed to move toward the outer casing, the circulating hooking assembly hooks the grab bar to temporarily fix the outer casing and the moving body in a closed state; when the moving body is pressed again under the closed state, the circulating hooking assembly releases the grab bar, letting the moving body rebound relative to the outer casing until the limiting hook hooks one end of the guiding groove.

2. The lifter with damping according to claim 1, wherein the damping gear is a PG-07F rotary plastic damper.

3. The lifter with damping according to claim 1, wherein the circulating hooking assembly is a DL-250 push latch.

4. The lifter with damping according to claim 1, wherein a plurality of first connecting holes are formed on one end of the moving body.

5. The lifter with damping according to claim 1, wherein a connecting board is further formed around the exterior of the outer casing, and a plurality of second connecting holes are formed on the connecting board.

6. The lifter with damping according to claim 1, wherein a plurality of guiding rails are formed inside the outer casing to limit and guide the moving body maintaining a linear movement inside the outer casing.

7. The lifter with damping according to claim 1, wherein the moving body further has an installation groove formed around the round hole for auxiliarily installing the damping gear on the moving body.

* * * * *